(12) United States Patent
Li et al.

(10) Patent No.: US 12,250,705 B2
(45) Date of Patent: Mar. 11, 2025

(54) PHYSICAL DOWNLINK CONTROL CHANNEL DETECTION METHOD AND APPARATUS

(71) Applicant: VIVO MOBILE COMMUNICATION CO., LTD., Guangdong (CN)

(72) Inventors: Gen Li, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 375 days.

(21) Appl. No.: 17/735,900

(22) Filed: May 3, 2022

(65) Prior Publication Data
US 2022/0264580 A1 Aug. 18, 2022

Related U.S. Application Data

(63) Continuation of application No. PCT/CN2020/126068, filed on Nov. 3, 2020.

(30) Foreign Application Priority Data

Nov. 6, 2019 (CN) .......................... 201911078521.8

(51) Int. Cl.
*H04W 72/53* (2023.01)
*H04W 24/08* (2009.01)
(Continued)

(52) U.S. Cl.
CPC ........... *H04W 72/53* (2023.01); *H04W 24/08* (2013.01); *H04W 72/0446* (2013.01);
(Continued)

(58) Field of Classification Search
CPC .... H04L 5/0096; H04L 5/0053; H04W 72/53; H04W 24/08; H04W 72/0446;
(Continued)

(56) References Cited

U.S. PATENT DOCUMENTS

2012/0320838 A1* 12/2012 Yang ..................... H04L 1/0061
370/329
2013/0194956 A1* 8/2013 Sartori ................... H04W 24/02
370/252
(Continued)

FOREIGN PATENT DOCUMENTS

CN 104067640 A 9/2014
CN 107453840 A 12/2017
(Continued)

OTHER PUBLICATIONS

"DL Frame Structure and COT Aspects for NR-U"; Lenovo et al.; 3GPP TSG RAN WG1#96 R1-1902955 Athens, Greece, Feb. 25-Mar. 1, 2019 (Year: 2019).*

(Continued)

*Primary Examiner* — Benjamin H Elliott, IV
(74) *Attorney, Agent, or Firm* — BROOKS KUSHMAN P.C.

(57) ABSTRACT

A physical downlink control channel detection method and apparatus, and pertains to the field of communications technologies. The physical downlink control channel detection method, applied to a terminal, includes: obtaining at least two search space groups and a switch condition, where the at least two search space groups include a first search space group and a second search space group; and switching between the first search space group and the second search space group according to the switch condition, for PDCCH detection. In the technical solutions provided in the present invention, switching of the terminal between different search space groups can be implemented.

15 Claims, 4 Drawing Sheets

Configure at least two search space groups and a switch condition for a terminal, where the at least two search space groups include a first search space group and a second search space group, and the switch condition is used by the terminal for switching between the first search space group and the second search space group, for physical downlink control channel PDCCH detection ~201

(51) Int. Cl.
    *H04W 72/0446*  (2023.01)
    *H04W 72/23*    (2023.01)
    *H04W 74/0816*  (2024.01)
    *H04W 76/20*    (2018.01)
    *H04W 36/08*    (2009.01)

(52) U.S. Cl.
    CPC ....... *H04W 72/23* (2023.01); *H04W 74/0816* (2013.01); *H04W 76/20* (2018.02); *H04W 36/08* (2013.01)

(58) Field of Classification Search
    CPC . H04W 72/23; H04W 74/0816; H04W 76/20; H04W 36/08; H04W 76/28; H04W 74/0808; H04W 36/06; H04W 36/0058; H04W 48/08; H04W 48/16; H04W 48/12
    See application file for complete search history.

(56) References Cited

U.S. PATENT DOCUMENTS

| | | | | |
|---|---|---|---|---|
| 2014/0177582 | A1* | 6/2014  | Wu        | H04L 5/0037 370/329 |
| 2015/0043473 | A1* | 2/2015  | Kim       | H04L 5/0053 370/329 |
| 2017/0181137 | A1* | 6/2017  | Yang      | H04L 69/324 |
| 2019/0141711 | A1* | 5/2019  | Fu        | H04W 72/23 |
| 2019/0207796 | A1* | 7/2019  | Hwang     | H04L 27/2676 |
| 2019/0223164 | A1* | 7/2019  | He        | H04L 25/0204 |
| 2019/0342777 | A1* | 11/2019 | Tiirola   | H04L 5/0091 |
| 2020/0213985 | A1* | 7/2020  | Baldemair | H04L 5/0053 |
| 2020/0245302 | A1* | 7/2020  | Pan       | H04W 5/0094 |
| 2020/0252958 | A1* | 8/2020  | Lu        | H04W 4/00 |
| 2020/0314898 | A1* | 10/2020 | Sun       | H04L 5/0048 |
| 2021/0067268 | A1* | 3/2021  | Seo       | H04L 25/0238 |
| 2021/0235469 | A1* | 7/2021  | Mu        | H04L 5/0048 |
| 2022/0159630 | A1* | 5/2022  | Nam       | H04W 72/23 |
| 2022/0264580 | A1* | 8/2022  | Li        | H04L 5/0053 |
| 2022/0361022 | A1* | 11/2022 | Cheng     | H04L 5/0094 |

FOREIGN PATENT DOCUMENTS

| | | |
|---|---|---|
| CN | 109196798 A    | 1/2019 |
| CN | 109391971 A    | 2/2019 |
| CN | 109417762 A    | 3/2019 |
| CN | 109644080 A    | 4/2019 |
| CN | 109983725 A    | 7/2019 |
| CN | 110313210 A    | 10/2019 |
| EP | 3534666 A1     | 9/2019 |
| WO | 2019063023 A1  | 4/2019 |
| WO | 2019143164 A1  | 7/2019 |

OTHER PUBLICATIONS

"Discussion on PDCCH monitoring after a COT initiated by gNB in Nr-U"; ITRI; 3GPP TSG RAN WG1 Meeting #96 R1-1902827 Athens, Greece, Feb. 25-Mar. 1, 2019 (Year: 2019).*

First Office Action for Japanese Application No. 2022-523717, dated Apr. 28, 2023, 3 Pages.

Ericsson "DL signals and channels for NR-U" 3GPP TSG-RAN WG1 Meeting #98bis, Chongqing, China, Aug. 2019, R1-1910945, 24 Pages.

ETRI "DL signals and channels for NR-U" 3GPP TSG RAN WG1 #98bis, Chongqing, China, Oct. 2019, R1-1910995, 6 Pages.

First Office Action for Chinese Application No. 201911078521.8, dated Aug. 31, 2021, 7 Pages.

Second Office Action for Chinese Application No. 201911078521.8, dated Mar. 11, 2022, 6 Pages.

International Search Report and Written Opinion for Application No. PCT/CN2020/126068, dated Feb. 3, 2021, 7 Pages.

ZTE, "Search Space Design for Enhanced PDCCH," 3GPP TSG RAN WG1 #68, Agenda item 7.6.3, Feb. 6-10, 2012, R1-120314, Dresden, Germany, 2 Pages.

VIVO, "Remaining Issues on PDCCH Search Space," 3GPP TSG RAN WG1 #92bis, Agenda item 7.1.3.1.2, Apr. 16-20, 2018, R1-1803828, Sanya, China, 6 Pages.

Qualcomm Incorporated, "Remaining Issues on Control Resource Set and Search Space," 3GPP TSG RAN WG1 #93, Agenda item 7.1.3.1.2, May 21-25, 2018, R1-1807353, Busan, Korea, 11 Pages.

Ericsson, "DL Signals and Channels for NR-U," 3GPP TSG-RAN WG1 #96bis, Agenda item 7.2.2.1.2, Apr. 8-12, 2019, R1-1904333, Xi'an, China, 8 Pages.

Qualcomm Incorporated, "DL Signals and Channels for NR-U," 3GPP TSG RAN WG1 #97, Agenda item 7.2.2.1.2, Apr. 12, 2019, R1-1907259, Reno, NV, USA, 12 Pages.

Extended European Search Report for Application No. 20885429.9-1215, dated Dec. 16, 2022, 13 pages.

Qualcomm Incorporated: "Summary of RRC parameters for NR-U up to RAN1", 3GPP Draft; RI-1911722, dated Oct. 31, 2019, 10 pages.

First Office Action for Korean Application No. 10-2022-7017079, dated Mar. 18, 2024, 5 Pages.

NTT Docomo, Inc. "DL signals and channels for NR-U" 3GPP TSG RAN WG1 #98bis, Chongqing, China, Oct. 2019, R1-1911158, 10 Pages.

Motorola Mobility, Lenovo "Feature lead summary for NR-U DL Signals and Channels" 3GPP TSG RAN WG1#98bis, Chongqing, China, Aug. 2019, R1-1911261, 31 Pages.

Ad-hoc Chair (Ericsson) "Chairman's notes of AI 7.2.2 NR-based Access to Unlicensed Spectrum" 3GPP TSG-RAN WG1 Meeting #98bis, Chongqing, China, Oct. 2019, R1-1911511, 13 Pages.

* cited by examiner

Configure at least two search space groups and a switch condition for a terminal, where the at least two search space groups include a first search space group and a second search space group, and the switch condition is used by the terminal for switching between the first search space group and the second search space group, for physical downlink control channel PDCCH detection ⎯⎯201

PHYSICAL DOWNLINK CONTROL CHANNEL DETECTION METHOD AND APPARATUS

CROSS-REFERENCE TO RELATED APPLICATIONS

This application is a continuation of International Application No. PCT/CN2020/126068 filed on Nov. 3, 2020, which claims priority to Chinese Patent Application No. 201911078521.8, filed on Nov. 6, 2019, which are incorporated herein by reference in their entireties.

TECHNICAL FIELD

The present invention relates to the field of communications technologies, and in particular, to a physical downlink control channel detection method and apparatus.

BACKGROUND

A new radio (NR) system supports configuring parameters such as PDCCH monitoring slot periodicity, offset, and monitoring duration differently for each physical downlink control channel (PDCCH) search space.

In related technologies, two search space groups are configured for a terminal, but how the terminal switches between the two search space groups is not specified.

SUMMARY

Embodiments of the present invention provide a physical downlink control channel detection method and apparatus.

According to a first aspect, an embodiment of the present invention provides a physical downlink control channel detection method. The method is applied to a terminal and includes: obtaining at least two search space groups and a switch condition, where the at least two search space groups include a first search space group and a second search space group; and switching between the first search space group and the second search space group according to the switch condition, for PDCCH detection.

According to a second aspect, an embodiment of the present invention provides a physical downlink control channel detection method. The method is applied to a network-side device and includes:
configuring at least two search space groups and a switch condition for a terminal, where the at least two search space groups include a first search space group and a second search space group, and the switch condition is used by the terminal for switching between the first search space group and the second search space group, for physical downlink control channel detection.

According to a third aspect, an embodiment of the present invention further provides a physical downlink control channel detection apparatus. The apparatus is applied to a terminal and includes:
an obtaining module, configured to obtain at least two search space groups and a switch condition, where the at least two search space groups include a first search space group and a second search space group; and
a processing module, configured to switch between the first search space group and the second search space group according to the switch condition, for PDCCH detection.

According to a fourth aspect, an embodiment of the present invention further provides a physical downlink control channel detection apparatus. The apparatus is applied to a network-side device and includes:
a configuration module, configured to configure at least two search space groups and a switch condition for a terminal, where the at least two search space groups include a first search space group and a second search space group, and the switch condition is used by the terminal for switching between the first search space group and the second search space group, for physical downlink control channel detection.

According to a fifth aspect, an embodiment of the present invention further provides a communications device, where the communications device includes a processor, a memory, and a computer program stored in the memory and running on the processor; and when the processor executes the computer program, steps of the foregoing physical downlink control channel detection method are implemented.

According to a sixth aspect, an embodiment of the present invention provides a computer-readable storage medium, where the computer-readable storage medium stores a computer program, and when the computer program is executed by a processor, steps of the foregoing physical downlink control channel detection method are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following describes example embodiments of the present invention in more detail with reference to the accompanying drawings. Although the example embodiments of the present invention are shown in the accompanying drawings, it should be understood that the present invention may be implemented in various forms and should not be limited by the embodiments set forth herein. On the contrary, the embodiments are provided to enable a more thorough understanding of the present invention and completely convey the scope of the present invention to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The CDMA system can implement radio technologies such as CDMA2000 and universal terrestrial radio access (UTRA). The UTRA includes wideband CDMA (WCDMA) and other CDMA variants. The TDMA system can implement radio technologies such as global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in the documents from an organization called "3rd generation partnership project" (3GPP). CDMA2000 and UMB are described in the documents from an organization called "3rd generation partnership project 2" (3GPP2). The technologies described in this specification are applicable not only to the above-mentioned systems and radio technologies, but also to other systems and radio technologies. However, in the following descriptions, an NR system is described for an illustration purpose, and NR terms are used in most of the following descriptions, although these technologies may also be applied to other applications than an NR system application.

The following descriptions provide examples without limiting the scope, applicability, or configuration set forth in the claims. The functions and arrangements of the elements under discussion may be changed without departing from the scope of this disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Figure 1:
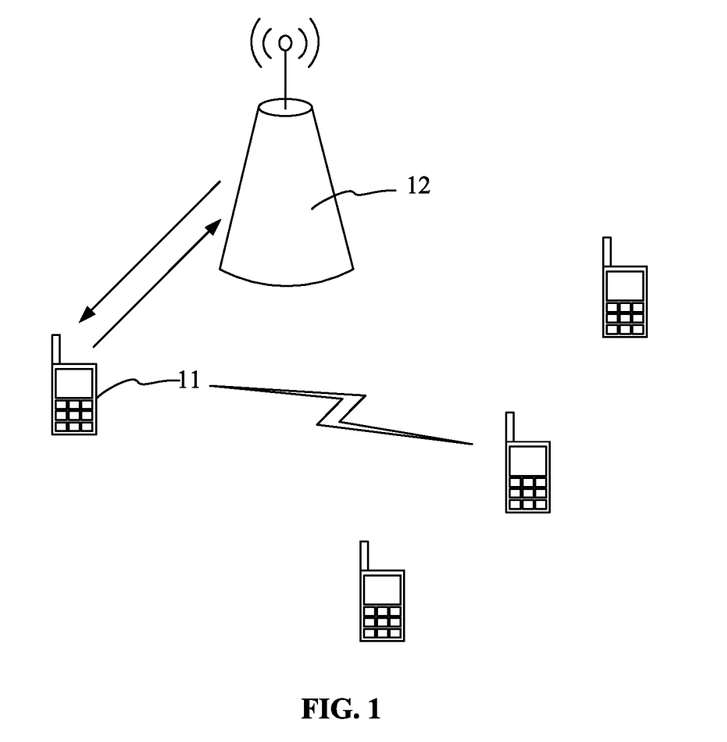
FIG. 1 is a block diagram of a mobile communications system to which an embodiment of the present invention is applicable.
Figure 2:
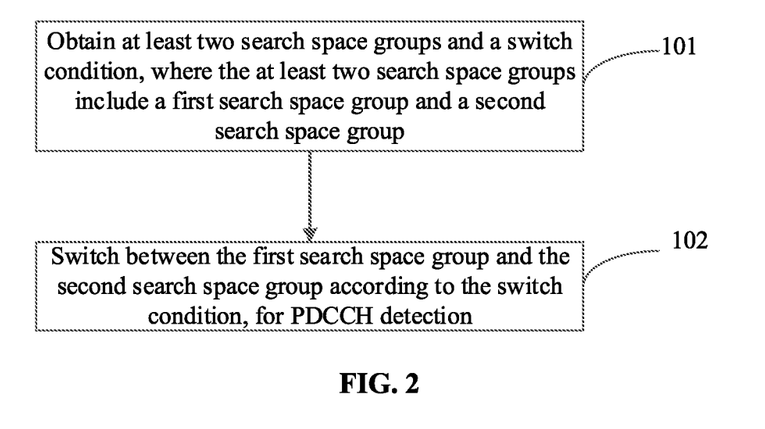
FIG. 2 is a schematic flowchart of a physical downlink control channel detection method for a terminal according to an embodiment of the present invention.

FIG. 1 is a block diagram of a wireless communications system to which an embodiment of the present invention is applicable. The wireless communications system includes a terminal 11 and a network-side device 12. The terminal 11 may also be referred to as a terminal device or user terminal (User Equipment, UE). The terminal 11 may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 11 is not limited in the embodiments of the present invention. The network-side device 12 may be a base station or a core network. The base station may be a 5G base station and a base station of a later version (for example, a gNB or a 5G NR NB), a base station in another communications system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. Provided that the same technical effects are achieved, the base station is not limited to a specific technical term. It should be noted that in the embodiments of the present invention, the base station in the NR system is merely used as an example, and a specific type of the base station is not limited.

Under control of a base station controller, the base station may communicate with the terminal 11. In various examples, the base station controller may be a part of the core network or some base stations. Some base stations may exchange control information or user data with the core network by using backhauls. In some examples, some of these base stations may communicate with each other directly or indirectly by using backhaul links. The backhaul links may be wired or wireless communication links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communication link. Each modulated signal may be transmitted on different carriers and may carry control information (for example, a reference signal or a control channel), overhead information, data, and the like.

The base station may perform wireless communication with the terminal 11 by using antennas of one or more access points. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cellular or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communication link in the wireless communications system may include an uplink for carrying uplink (UL) transmission (for example, from the terminal 11 to the network-side device 12) or a downlink for carrying downlink (DL) transmission (for example, from the network-side device 12 to the terminal 11). UL transmission may also be referred to as reverse link transmission, and DL transmission may also be referred to as forward link transmission. Downlink transmission may be implemented by using a licensed band, an unlicensed band, or both. Similarly, uplink transmission may be implemented by using a licensed band, an unlicensed band, or both.

A new radio (NR) system supports configuring parameters such as PDCCH monitoring slot periodicity, offset, and monitoring duration differently for each physical downlink control channel (PDCCH) search space.

In addition, the PDCCH search space is classified into a common search space and a terminal (User Equipment, UE)-specific search space, and the two types of search spaces can be scrambled by using different radio network temporary identities (RNTI). Downlink control information (DCI) transmitted on a PDCCH is in the following different formats.

| DCI formats | |
|---|---|
| DCI format | Usage |
| 0_0 | Scheduling of a physical uplink shared channel in one cell (Scheduling of PUSCH in one cell); fallback DCI |
| 0_1 | Scheduling of PUSCH in one cell; non-fallback DCI |
| 1_0 | Scheduling of a physical downlink shared channel in one cell (Scheduling of PDSCH in one cell); fallback DCI |
| 1_1 | Scheduling of PDSCH in one cell; non-fallback DCI |
| 2_0 | Notifying a group of UEs of the slot format |
| 2_1 | Notifying a group of UEs of physical resource block(s) and orthogonal frequency division multiplexing symbol(s) where UE may assume no transmission is intended for the UE (Notifying a group of UEs of the PRB(s) and OFDM symbol(s) where UE may assume no transmission is intended for the UE) |
| 2_2 | Transmission of transmit power control commands for a physical uplink control channel and a physical uplink shared channel (Transmission of TPC commands for PUCCH and PUSCH) |
| 2_3 | Transmission of a group of transmit power control commands for sounding reference signal transmissions by one or more UEs (Transmission of a group of TPC commands for SRS transmissions by one or more UEs) |

In a new radio unlicensed band, before sending information, the terminal or the network-side device needs to perform clear channel assessment (CCA) and/or extended clear channel assessment (eCCA) for channel monitoring, that is, energy detection (ED). Transmission can be started only when energy is lower than a specific threshold and a channel is determined to be idle, that is, LBT (listen before talk). Because the unlicensed band is shared by a plurality of technologies or a plurality transmission nodes, such contention-based access mode leads to uncertainty of when a channel is available. When the channel is available, a position that can be used for network-side signal transmission may have been missed and sending cannot be performed. As a result, a receive end may fail to normally receive a signal of network-side configuration, and may fail to perform terminal behavior, such as PDCCH monitoring or wireless environment detection and management, based on the network-side configuration after receiving the signal. A procedure for determining whether the channel is idle through CCA and performing transmission may be referred to as a channel access procedure.

Currently, the following three types of channel access procedures can be used in a 5G unlicensed communications system.

Cat 1: Direct sending without any CCA, which can be used in a case in which a channel has been obtained and a transmission conversion interval is less than 16 us.

Cat 2 (Type II): Channel monitoring at an interval of 16 us or 25 us, which can be used for a specific signal obtaining channel, with a maximum continuous transmission length less than a particular value, for example, 1 ms.

Cat 3 (Type III): Random fallback channel monitoring in which a transmittable maximum length of a finally obtained channel varies with different priority parameter settings.

In related technologies, two search space groups are configured for a terminal, but how the terminal switches between the two search space groups is not specified. In addition, a PDCCH detection latency and the use of different search space groups in different cases are not considered when the terminal switches between the search space groups.

Embodiments of the present invention provide a physical downlink control channel detection method and apparatus, to implement switching of a terminal between different search space groups.

An embodiment of the present invention provides a physical downlink control channel detection method. The method is applied to a terminal and includes the following steps.

Step 101: Obtain at least two search space groups and a switch condition, where the at least two search space groups include a first search space group and a second search space group.

Step 102: Switch between the first search space group and the second search space group according to the switch condition, for PDCCH detection.

In this embodiment, a network-side device configures at least two search space groups and a switch condition for the terminal, where the at least two search space groups include a first search space group and a second search space group; and the terminal can switch between the first search space group and the second search space group according to the switch condition, for PDCCH detection. In the technical solution of this embodiment, a basis for the terminal to switch between the first search space group and the second search space group is clarified.

The at least two search space groups may be configured by the network-side device or prescribed by a protocol; and the switch condition may be configured by the network-side device or prescribed by a protocol.

The first search space group may be a default search space group. The terminal performs PDCCH detection in the first search space group when any one of the following conditions is satisfied:

at initial access to a network with a configured search space group obtained;

at transit from a discontinuous reception (DRX) off state to a DRX on state;

after switching to a new bandwidth part BWP; and after switching to a new cell.

The technical solution of this embodiment specifies that in the foregoing cases, PDCCH detection may be performed in the first search space group.

The terminal performs PDCCH detection in the first search space group at an initial state, and when the switch condition is satisfied, switches between the first search space group and the second search space group according to the switch condition, for PDCCH detection.

In a specific example, the switch condition includes a first switch condition for switching from the first search space group to the second search space group for PDCCH detection, and the first switch condition includes:

switching to the second search space group for PDCCH detection in a preset time length after a time when a PDCCH that meets a preset condition is detected.

Optionally, the preset condition includes at least one of the following:

the PDCCH is a PDCCH that is detected in the first search space group;

the PDCCH is a PDCCH that is scrambled by a specific radio network temporary identity (RNTI), where the specific RNTI may be a slot format indicator radio network temporary identity (Slot Format Indicator-RNTI, SFI-RNTI) or a cell radio network temporary identity (Cell-RNTI, C-RNTI); and content of the PDCCH explicitly indicates switching between search space groups.

Optionally, the preset time length is obtained in any one of the following manners:

obtaining a predefined preset time length;

obtaining a preset time length configured by radio resource control (RRC) signaling;

obtaining a correspondence between PDCCH types and preset time lengths that is configured by RRC signaling, and determining the preset time length based on the correspondence and the PDCCH type;

obtaining a predefined correspondence between PDCCH types and preset time lengths, and determining the preset time length based on the correspondence and the PDCCH type; and obtaining a preset time length that is explicitly indicated by downlink control information DCI on the PDCCH.

The preset time length requires to be longer than or equal to a processing latency of the PDCCH. In the switch solution of this embodiment, the processing latency of the PDCCH is considered, so that normal transmission can be ensured.

In another specific example, the switch condition includes a second switch condition for switching from the second search space group to the first search space group for PDCCH detection, and the second switch condition includes any one of the following:

if the terminal has obtained channel occupancy time (COT) information, switching to the first search space group for PDCCH detection at the end of the COT;

after an effective time length that is indicated by DCI on the detected PDCCH, switching to the first search space group for PDCCH detection;

obtaining a predefined first timer, starting the first timer when PDCCH detection is started in the second search space group, and if no PDCCH is detected after the first timer expires, switching to the first search space group for PDCCH detection; and obtaining a first timer that is configured by RRC signaling, starting the first timer when PDCCH detection is started in the second search space group, and if no PDCCH is detected after the first timer expires, switching to the first search space group for PDCCH detection.

The first timer may be determined based on a channel access type. The channel access type includes frame based channel access, which is applicable to frame based equipment (FBE), and the channel access type also includes load based channel access, which is applicable to load based equipment (LBE).

The foregoing PDCCH includes a group common (GC)-PDCCH.

Figure 3:
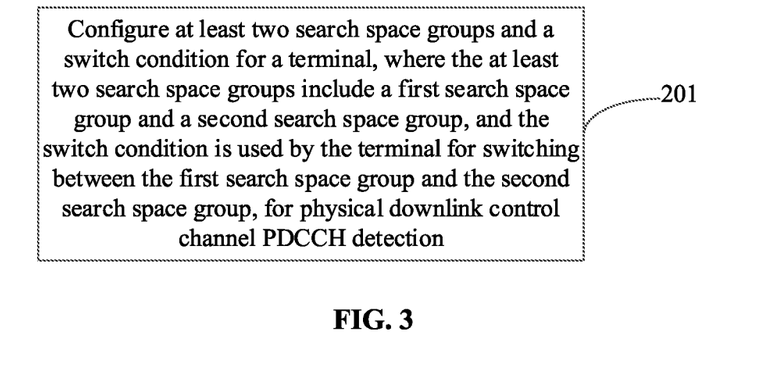
FIG. 3 is a schematic flowchart of a physical downlink control channel detection method for a network-side device according to an embodiment of the present invention.

An embodiment of the present invention further provides a physical downlink control channel detection method. As shown in FIG. 3, the method is applied to a network-side device and includes the following step.

Step 201: Configure at least two search space groups and a switch condition for a terminal, where the at least two search space groups include a first search space group and a second search space group, and the switch condition is used by the terminal for switching between the first search space group and the second search space group, for physical downlink control channel detection.

In this embodiment, the network-side device configures at least two search space groups and a switch condition for the terminal, where the at least two search space groups include a first search space group and a second search space group; and the terminal can switch between the first search space group and the second search space group according to the switch condition, for PDCCH detection.

In a specific example, the switch condition includes a first switch condition for switching from the first search space group to the second search space group for PDCCH detection, and the first switch condition includes:

switching to the second search space group for PDCCH detection in a preset time length after a time when a PDCCH that meets a preset condition is detected.

Optionally, the preset condition includes at least one of the following:

the PDCCH is a PDCCH that is detected in the first search space group;

the PDCCH is a PDCCH that is scrambled by a specific radio network temporary identity RNTI, where the specific RNTI may be a slot format indicator radio network temporary identity (Slot Format Indicator-RNTI, SFI-RNTI) or a cell radio network temporary identity (Cell-RNTI, C-RNTI); and content of the PDCCH explicitly indicates switching between search space groups.

Optionally, the method further includes: configuring the preset time length for the terminal, and the configuring the preset time length for the terminal includes any one of the following:

configuring the preset time length by using radio resource control RRC signaling;

configuring a correspondence between PDCCH types and preset time lengths by using RRC signaling; and explicitly indicating a preset time length by using DCI on the PDCCH.

To ensure normal transmission, the preset time length requires to be longer than or equal to a processing latency of the PDCCH.

In another specific example, the switch condition includes a second switch condition for switching from the second search space group to the first search space group for PDCCH detection, and the second switch condition includes any one of the following:

if the terminal has obtained channel occupancy time COT information, switching to the first search space group for PDCCH detection at the end of the COT;

after an effective time length that is indicated by DCI on the detected PDCCH, switching to the first search space group for PDCCH detection;

obtaining a predefined first timer, starting the first timer when PDCCH detection is started in the second search space group, and if no PDCCH is detected after the first timer expires, switching to the first search space group for PDCCH detection; and obtaining a first timer that is configured by RRC signaling, starting the first timer when PDCCH detection is started in the second search space group, and if no PDCCH is detected after the first timer expires, switching to the first search space group for PDCCH detection.

The first timer may be determined based on a channel access type. The channel access type includes frame based channel access, which is applicable to frame based equipment (FBE), and the channel access type also includes load based channel access, which is applicable to load based equipment (LBE).

The foregoing PDCCH includes a group common (GC)-PDCCH.

Figure 4:
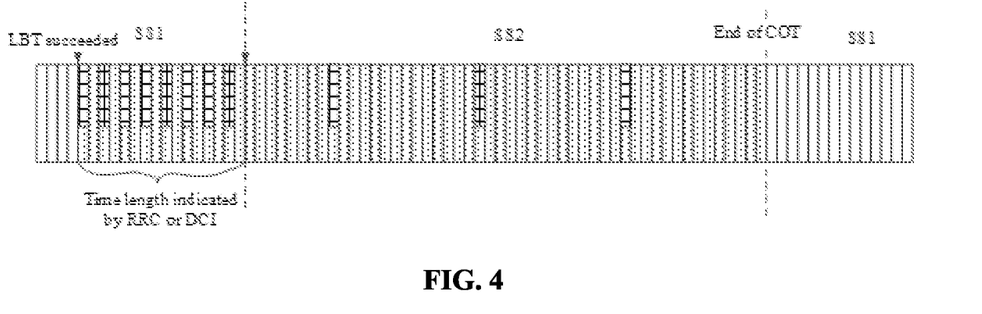
FIG. 4 is a schematic diagram of switching between search space groups according to a specific embodiment of the present invention.

In a specific embodiment, as shown in FIG. 4, two UE-specific search spaces (SS), SS1 and SS2, are configured for a terminal. A PDCCH monitoring periodicity configured in the SS1 is two symbols, and a PDCCH monitoring periodicity configured in the SS2 is one slot. As shown in FIG. 4, a preset time length indicated by RRC or DCI is 16 symbols. After receiving 16 symbols of a PDCCH, the terminal changes to perform PDCCH detection in the SS2, and changes to perform PDCCH detection in the SS1 at the end of the indicated COT.

Figure 5:
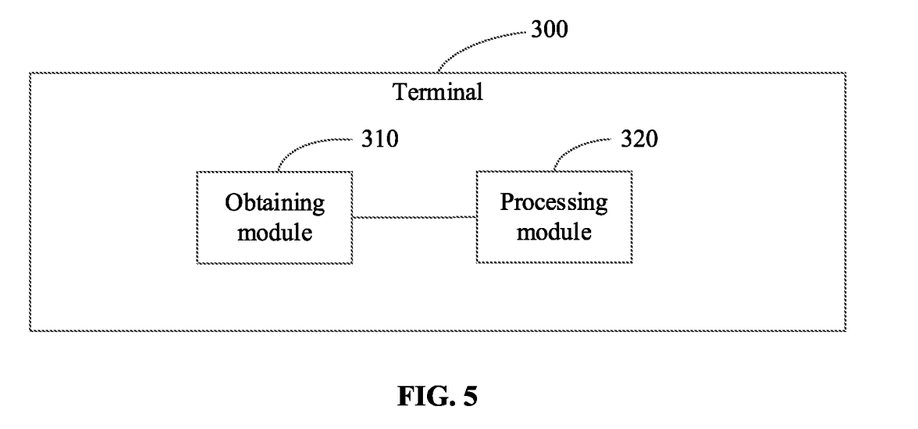
FIG. 5 is a schematic modular structure diagram of a terminal according to an embodiment of the present invention.

As shown in FIG. 5, a terminal 300 in an embodiment of the present invention includes a physical downlink control channel detection apparatus, and is capable of implementing the physical downlink control channel detection method in the foregoing embodiment, with the same effects achieved. The terminal 300 specifically includes the following functional modules:

an obtaining module 310, configured to obtain at least two search space groups and a switch condition, where the at least two search space groups include a first search space group and a second search space group; and a processing module 320, configured to switch between the first search space group and the second search space group according to the switch condition, for PDCCH detection.

In this embodiment, a network-side device configures at least two search space groups and a switch condition for the terminal, where the at least two search space groups include a first search space group and a second search space group; and the terminal can switch between the first search space group and the second search space group according to the switch condition, for PDCCH detection.

The first search space group may be a default search space group. The processing module 320 performs PDCCH detection in the first search space group when any one of the following conditions is satisfied:

at initial access to a network with a configured search space group obtained;

at transit from a discontinuous reception (DRX) off state to a DRX on state;

after switching to a new bandwidth part BWP; and after switching to a new cell.

The terminal performs PDCCH detection in the first search space group at an initial state, and when the switch condition is satisfied, switches between the first search space group and the second search space group according to the switch condition, for PDCCH detection.

In a specific example, the switch condition includes a first switch condition for switching from the first search space group to the second search space group for PDCCH detection, and the first switch condition includes:

switching to the second search space group for PDCCH detection in a preset time length after a time when a PDCCH that meets a preset condition is detected.

Optionally, the preset condition includes at least one of the following:

the PDCCH is a PDCCH that is detected in the first search space group;

the PDCCH is a PDCCH that is scrambled by a specific RNTI, where the specific RNTI may be an SFI-RNTI or a C-RNTI; and content of the PDCCH explicitly indicates switching between search space groups.

Optionally, the preset time length is obtained in any one of the following manners:

obtaining a predefined preset time length;

obtaining a preset time length configured by RRC signaling;

obtaining a correspondence between PDCCH types and preset time lengths that is configured by RRC signaling, and determining the preset time length based on the correspondence and the PDCCH type;

obtaining a predefined correspondence between PDCCH types and preset time lengths, and determining the preset time length based on the correspondence and the PDCCH type; and obtaining a preset time length that is explicitly indicated by downlink control information DCI on the PDCCH.

To ensure normal transmission, the preset time length requires to be longer than or equal to a processing latency of the PDCCH.

In another specific example, the switch condition includes a second switch condition for switching from the second search space group to the first search space group for PDCCH detection, and the second switch condition includes any one of the following:

if the terminal has obtained COT information, switching to the first search space group for PDCCH detection at the end of the COT;

after an effective time length that is indicated by DCI on the detected PDCCH, switching to the first search space group for PDCCH detection;

obtaining a predefined first timer, starting the first timer when PDCCH detection is started in the second search space group, and if no PDCCH is detected after the first timer expires, switching to the first search space group for PDCCH detection; and obtaining a first timer that is configured by RRC signaling, starting the first timer when PDCCH detection is started in the second search space group, and if no PDCCH is detected after the first timer expires, switching to the first search space group for PDCCH detection.

The first timer may be determined based on a channel access type. The channel access type includes frame based channel access, which is applicable to frame based equipment (FBE), and the channel access type also includes load based channel access, which is applicable to load based equipment (LBE).

The foregoing PDCCH includes a group common (GC)-PDCCH.

Figure 6:
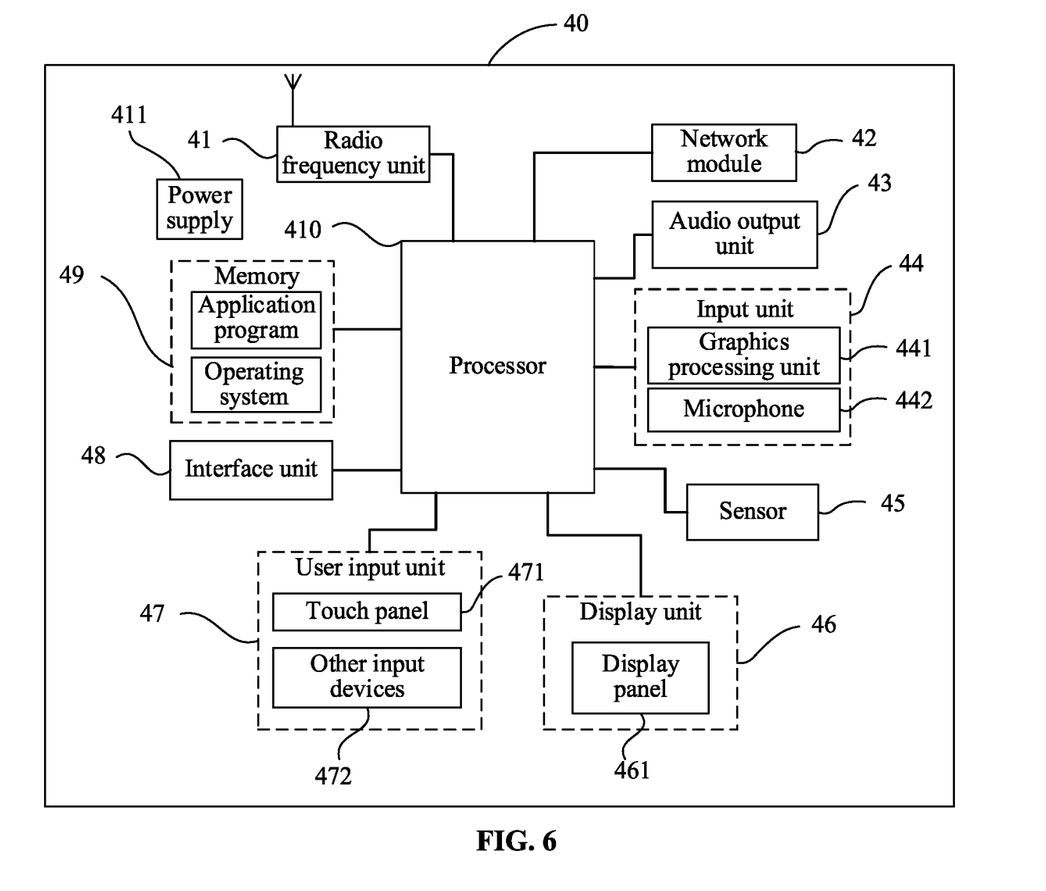
FIG. 6 is a block diagram of a terminal according to an embodiment of the present invention.

To better achieve the foregoing objective, further, FIG. 6 is a schematic diagram of a hardware structure of a terminal for implementing each embodiment of the present invention.

The terminal 40 includes, but is not limited to, components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art can understand that the terminal structure shown in FIG. 6 does not constitute a limitation on the terminal. The terminal may include more or fewer components than those shown in the figure, or some components may be combined, or there may be a different component layout. In this embodiment of the present invention, the terminal includes but is not limited to a mobile phone, a tablet computer, a notebook computer, a palmtop computer, a vehicle-mounted terminal, a wearable device, a pedometer, or the like.

The processor 410 is configured to: obtain at least two search space groups and a switch condition, where the at least two search space groups include a first search space group and a second search space group; and switch between the first search space group and the second search space group according to the switch condition, for PDCCH detection.

It should be understood that in this embodiment of the present invention, the radio frequency unit 41 may be configured to receive and send signals during an information receiving and sending process or a call process. Specifically, the radio frequency unit 41 receives downlink data from a base station and delivers the downlink data to the processor 410 for processing; and in addition, the radio frequency unit 41 sends uplink data to the base station. Usually, the radio frequency unit 41 includes but is not limited to an antenna, at least one amplifier, a transceiver, a coupler, a low noise amplifier, a duplexer, and the like. In addition, the radio frequency unit 41 may further communicate with a network and another device by using a wireless communications system.

The terminal provides wireless broadband Internet access for a user by using the network module 42, for example, helping the user transmit and receive e-mails, browse web pages, and access streaming media.

The audio output unit 43 may convert audio data received by the radio frequency unit 41 or the network module 42 or stored in the memory 49 into an audio signal and output the audio signal as a sound. In addition, the audio output unit 43 may further provide audio output (for example, a call signal reception sound or a message reception sound) related to a specific function performed by the terminal 40. The audio output unit 43 includes a speaker, a buzzer, a receiver, and the like.

The input unit 44 is configured to receive an audio or video signal. The input unit 44 may include a graphics processing unit (GPU) 441 and a microphone 442. The graphics processing unit 441 processes image data of a static picture or a video that is obtained by an image capture apparatus (for example, a camera) in a video capture mode or an image capture mode. A processed image frame may be displayed on the display unit 46. The image frame processed by the graphics processing unit 441 may be stored in the memory 49 (or another storage medium) or transmitted by the radio frequency unit 41 or the network module 42. The microphone 442 may receive sounds and process such sounds into audio data. The processed audio data can be converted into a format output that can be sent to a mobile communication base station through the radio frequency unit 41 in a telephone call mode.

The terminal 40 further includes at least one sensor 45, for example, an optical sensor, a motion sensor, and another sensor. Specifically, the optical sensor includes an ambient light sensor and a proximity sensor. The ambient light sensor may adjust brightness of a display panel 461 based on intensity of ambient light. When the terminal 40 moves to an ear, the proximity sensor may turn off the display panel 461 and/or backlight. As a motion sensor, an accelerometer sensor may detect magnitudes of accelerations in all directions (usually three axes), may detect a magnitude and a direction of gravity when the terminal is still, and may be applied to posture recognition (for example, landscape/portrait mode switching, a related game, or magnetometer posture calibration) of the terminal, a function related to vibration recognition (for example, a pedometer or a keystroke), or the like. The sensor 45 may further include a fingerprint sensor, a pressure sensor, an iris sensor, a molecular sensor, a gyroscope, a barometer, a hygrometer, a thermometer, an infrared sensor, or the like. Details are not described herein.

The display unit 46 is configured to display information entered by the user or information provided for the user. The display unit 46 may include the display panel 461, and the display panel 461 may be configured in a form of a liquid crystal display (LCD), an organic light-emitting diode (OLED), or the like.

The user input unit 47 may be configured to receive input digit or character information and generate key signal input related to user setting and function control of the terminal. Specifically, the user input unit 47 includes a touch panel 471 and other input devices 472. The touch panel 471 is also referred to as a touchscreen and may collect a touch operation (such as an operation performed by the user on the touch panel 471 or near the touch panel 471 with a finger or by using any proper object or accessory such as a stylus) of the user on or near the touch panel 471. The touch panel 471 may include two parts: a touch detection apparatus and a touch controller. The touch detection apparatus detects a touch orientation of the user, detects a signal carried by the touch operation, and transmits the signal to the touch controller. The touch controller receives touch information from the touch detection apparatus, converts the touch information into contact coordinates, transmits the contact coordinates to the processor 410, receives a command transmitted by the processor 410, and executes the command. In addition, the touch panel 471 may be implemented in a plurality of types, for example, as a resistive, capacitive, infrared, or surface acoustic wave touch panel. In addition to the touch panel 471, the user input unit 47 may further include the other input devices 472. Specifically, the other input devices 472 may include but are not limited to a physical keyboard, a function key (such as a volume control key or an on/off key), a trackball, a mouse, and a joystick. Details are not described herein.

Further, the touch panel 471 may cover the display panel 461. After detecting a touch operation on or near the touch panel 471, the touch panel 471 transmits the touch operation to the processor 410 to determine a type of a touch event. Then the processor 410 provides corresponding visual output on the display panel 461 based on the type of the touch event. In FIG. 6, the touch panel 471 and the display panel 461 serve as two separate components to implement input and output functions of the terminal. However, in some embodiments, the touch panel 471 and the display panel 461 may be integrated to implement the input and output functions of the terminal. This is not specifically limited herein.

The interface unit 48 is an interface for connecting an external apparatus to the terminal 40. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, and the like. The interface unit 48 may be configured to receive input (for example, data information and electric power) from the external apparatus, and transmit the received input to one or more elements in the terminal 40; or may be configured to transmit data between the terminal 40 and the external apparatus.

The memory 49 may be configured to store software programs and various data. The memory 49 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 49 may include a high-speed random access memory, or may include a nonvolatile memory, for example, at least one magnetic disk storage device or a flash memory device, or other volatile solid-state storage device.

The processor 410 is a control center of the terminal, connects various parts of the entire terminal by using various interfaces and lines, and performs various functions and data processing of the terminal by running or executing a software program and/or a module stored in the memory 49 and invoking data stored in the memory 49, to perform overall monitoring on the terminal. The processor 410 may include one or more processing units. Preferably, an application processor and a modem processor may be integrated in the processor 410. The application processor primarily processes an operating system, user interfaces, application programs, and the like. The modem processor primarily processes radio communication. It can be understood that the modem processor may be alternatively not integrated in the processor 410.

The terminal 40 may further include a power supply 411 (such as a battery) that supplies power to components. Preferably, the power supply 411 may be logically connected to the processor 410 by using a power supply management system, thereby implementing functions such as charging management, discharging management, and power consumption management by using the power supply management system.

In addition, the terminal 40 includes some functional modules that are not shown. Details are not described herein.

Preferably, an embodiment of the present invention further provides a terminal, including a processor 410, a memory 49, and a computer program stored in the memory 49 and capable of running on the processor 410. When the computer program is executed by the processor 410, each process of the foregoing physical downlink control channel detection method embodiment is implemented, with the same technical effect achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device (User Device or User Equipment). This is not limited herein.

An embodiment of the present invention further provides a computer-readable storage medium, where the computer-readable storage medium stores a computer program, and when the computer program is executed by a processor, each process of the foregoing physical downlink control channel detection method embodiment on the terminal side is implemented, with the same technical effects achieved. To avoid repetition, details are not described herein again. The computer-readable storage medium is, for example, a read-only memory (ROM), a random access memory (RAM), a magnetic disk, or an optical disc.

Figure 7:
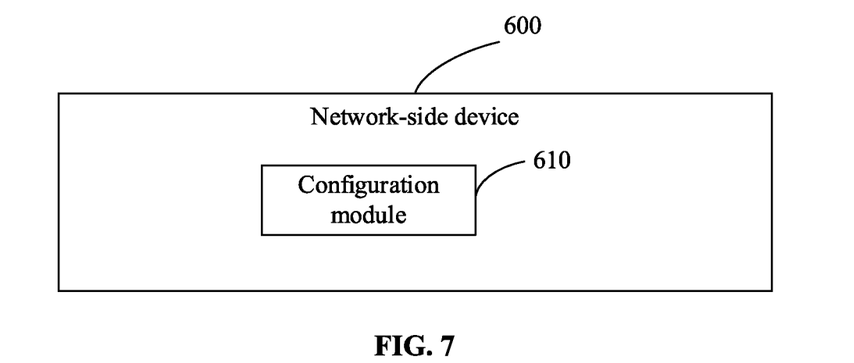
FIG. 7 is a schematic modular structure diagram of a network-side device according to an embodiment of the present invention.

As shown in FIG. 7, a network-side device 600 in an embodiment of the present invention includes a physical downlink control channel detection apparatus, and is capable of implementing the physical downlink control channel detection method in the foregoing embodiment, with the same effects achieved. The network-side device 600 specifically includes the following functional module:

a configuration module 610, configured to configure at least two search space groups and a switch condition for a terminal, where the at least two search space groups include a first search space group and a second search space group, and the switch condition is used by the terminal for switching between the first search space group and the second search space group, for physical downlink control channel detection.

In this embodiment, the network-side device configures at least two search space groups and a switch condition for the terminal, where the at least two search space groups include a first search space group and a second search space group; and the terminal can switch between the first search space group and the second search space group according to the switch condition, for PDCCH detection.

In a specific example, the switch condition includes a first switch condition for switching from the first search space group to the second search space group for PDCCH detection, and the first switch condition includes:

switching to the second search space group for PDCCH detection in a preset time length after a time when a PDCCH that meets a preset condition is detected.

Optionally, the preset condition includes at least one of the following:

the PDCCH is a PDCCH that is detected in the first search space group;

the PDCCH is a PDCCH that is scrambled by a specific radio network temporary identity RNTI, where the specific RNTI may be a slot format indicator radio network temporary identity (Slot Format Indicator-RNTI, SFI-RNTI) or a cell radio network temporary identity (Cell-RNTI, C-RNTI); and content of the PDCCH explicitly indicates switching between search space groups.

Optionally, the configuration module 610 is further configured to configure the preset time length for the terminal, and the configuring the preset time length for the terminal includes any one of the following:

configuring the preset time length by using radio resource control RRC signaling;

configuring a correspondence between PDCCH types and preset time lengths by using RRC signaling; and explicitly indicating a preset time length by using DCI on the PDCCH.

To ensure normal transmission, the preset time length requires to be longer than or equal to a processing latency of the PDCCH.

In another specific example, the switch condition includes a second switch condition for switching from the second search space group to the first search space group for PDCCH detection, and the second switch condition includes any one of the following:

if the terminal has obtained channel occupancy time COT information, switching to the first search space group for PDCCH detection at the end of the COT;

after an effective time length that is indicated by DCI on the detected PDCCH, switching to the first search space group for PDCCH detection;

obtaining a predefined first timer, starting the first timer when PDCCH detection is started in the second search space group, and if no PDCCH is detected after the first timer expires, switching to the first search space group for PDCCH detection; and obtaining a first timer that is configured by RRC signaling, starting the first timer when PDCCH detection is started in the second search space group, and if no PDCCH is detected after the first timer expires, switching to the first search space group for PDCCH detection.

The first timer may be determined based on a channel access type. The channel access type includes frame based channel access, which is applicable to frame based equipment (FBE), and the channel access type also includes load based channel access, which is applicable to load based equipment (LBE).

The foregoing PDCCH includes a GC-PDCCH.

It should be noted that division of modules of the network-side device and the terminal is merely logical function division. The modules may be all or partially integrated in a physical entity or may be physically separate in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a foregoing module may be a processing component that is separately disposed, or may be integrated in a chip of the apparatus for implementation. In addition, the module may be stored in the memory of the apparatus in a form of program code, and is invoked by a processing component of the apparatus to perform a function of the foregoing module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the foregoing modules may be configured as one or more integrated circuits that implement the foregoing methods, such as one or more application-specific integrated circuits (ASIC), one or more microprocessors (digital signal processor, DSP), or one or more field programmable gate arrays (FPGA). For another example, when one of the foregoing modules is implemented by invoking program code by the processing component, the processing component may be a general-purpose processor, such as a central processing unit (CPU), or another processor that can invoke the program code. For still another example, these modules may be integrated together and implemented in a system-on-a-chip (SOC) form.

To better achieve the foregoing objective, an embodiment of the present invention further provides a network-side device. The network-side device includes a processor, a memory, and a computer program stored in the memory and capable of running on the processor, where when the computer program is executed by the processor, steps of the foregoing physical downlink control channel detection method are implemented, with same technical effects achieved. To avoid repetition, details are not described herein again.

Figure 8:
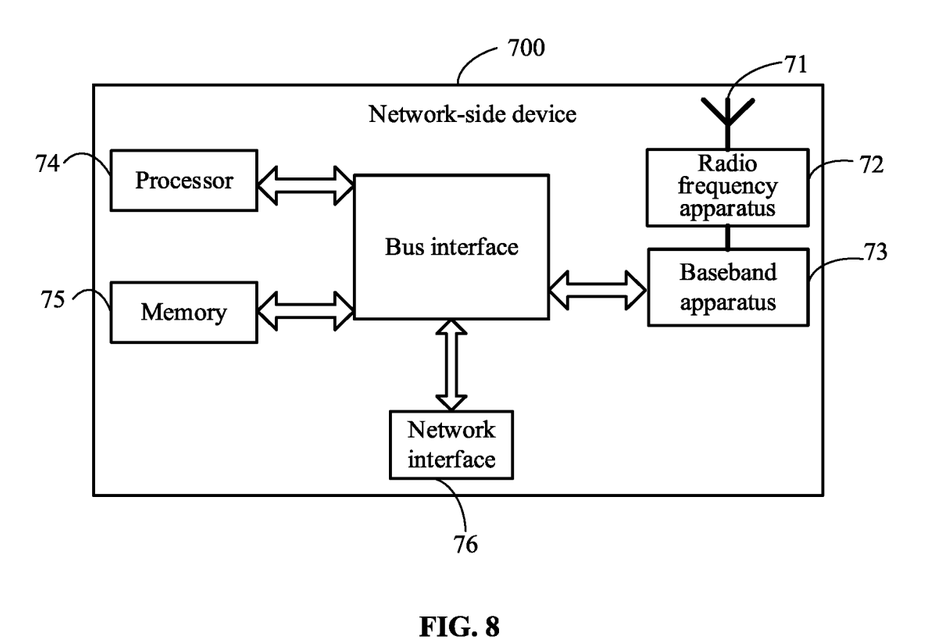
FIG. 8 is a block diagram of a network-side device according to an embodiment of the present invention.

Specifically, an embodiment of the present invention further provides a network-side device. As shown in FIG. 8, the network-side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and transmits the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The method performed by the network-side device in the foregoing embodiment may be implemented in the baseband apparatus 73, and the baseband apparatus 73 includes a processor 74 and a memory 75.

The baseband apparatus 73 may include, for example, at least one baseband board and a plurality of chips are disposed on the baseband board. As shown in FIG. 8, one of the chips is, for example, the processor 74, connected to the memory 75, to invoke a program in the memory 75 to perform operations of the network-side device shown in the foregoing method embodiment.

The baseband apparatus 73 may further include a network interface 76, configured to exchange information with the radio frequency apparatus 72, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network-side device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), and an electrically erasable programmable read-only memory (EEPROM), or a flash memory. The volatile memory may be a random access memory (RAM), which is used as an external cache. For illustrative rather than restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 75 described in this application is intended to include but is not limited to these and any other suitable types of memories.

Specifically, the network-side device in this embodiment of the present invention further includes a computer program stored in the memory 75 and capable of running on the processor 74. The processor 74 invokes the computer program in the memory 75 to perform the method performed by the modules shown in FIG. 7.

Specifically, when being invoked by the processor 74, the computer program may be used to configure at least two search space groups and a switch condition for a terminal, where the at least two search space groups include a first search space group and a second search space group, and the switch condition is used by the terminal for switching between the first search space group and the second search space group, for physical downlink control channel detection.

An embodiment of the present invention further provides a computer-readable storage medium, where the computer-readable storage medium stores a computer program, and when the computer program is executed by a processor, steps of the foregoing physical downlink control channel detection method that is applied to the network-side device are implemented, with the same technical effects achieved. To avoid repetition, details are not described herein again.

A person of ordinary skill in the art may realize that units and algorithm steps of various examples described with reference to the embodiments disclosed in this specification can be implemented by using electronic hardware, or a combination of a computer software and electronic hardware. Whether the functions are performed by hardware or software depends on particular applications and design constraints of the technical solutions. A skilled person in the art may use different methods to implement the described functions for each particular application, but it should not be considered that the implementation goes beyond the scope of the present invention.

It can be clearly understood by a skilled person in the art that, for convenient and brief description, for a detailed working process of the systems, apparatuses, and units in the foregoing description, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network-side device, or the like) to perform all or some of the steps of the method described in the embodiments of the present invention. The foregoing storage medium includes any medium that can store program code, such as a USB flash drive, a removable hard disk, a ROM, a RAM, a magnetic disk, or an optical disc.

In addition, it should be noted that in the apparatus and method of the present invention, apparently, the components or steps may be decomposed and/or recombined. The decomposition and/or recombination should be considered as an equivalent solution of the present invention. In addition, the steps for performing the foregoing series of processing may be performed in a chronological order, but do not necessarily need to be performed in a chronological order. Some steps may be performed in parallel or independently. A person of ordinary skill in the art can understand that all or any of the steps or components of the method and the apparatus in the present invention may be implemented in any computing apparatus (including a processor, a storage medium, and the like) or a network of computing apparatuses through hardware, firmware, software, or a combination thereof. This can be implemented by a person of ordinary skill in the art who has read the descriptions of the present invention, by using their basic programming skills.

It can be understood that the embodiments described in some embodiments of this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

Therefore, the objectives of the present invention can also be implemented by running a program or a set of programs on any computing apparatus. The computing apparatus may be a general apparatus of common sense. Therefore, the objective of the present invention may also be implemented by providing only a program product that includes program code for implementing the method or apparatus. Therefore, such program product also constitutes the present invention, and a storage medium storing such program product also constitutes the present invention. Apparently, the storage medium may be any storage medium of common sense or any storage medium that will be developed in the future. It should be further noted that in the apparatus and method of the present invention, apparently, the components or steps may be decomposed and/or recombined. The decomposition and/or recombination should be considered as an equivalent solution of the present invention. In addition, steps for performing the foregoing series of processing may be naturally performed in time sequence following the order of description, but are not necessarily performed in time sequence. Some steps may be performed in parallel or separate from each other.

The foregoing descriptions are preferred implementations of the present invention. It should be noted that persons of ordinary skill in the art may make several improvements or polishing without departing from the principle of the present invention and the improvements or polishing shall fall within the protection scope of the present invention.

What is claimed is:

1. A physical downlink control channel detection method, applied to a terminal and comprising:
   obtaining at least two search space groups and a switch condition, wherein the at least two search space groups comprise a first search space group and a second search space group; and
   switching between the first search space group and the second search space group according to the switch condition, for PDCCH detection;
   wherein the switch condition comprises a first switch condition for switching from the first search space group to the second search space group for PDCCH detection, and the first switch condition comprises:
   switching to the second search space group for PDCCH detection in a preset time length after a time when a PDCCH that meets a preset condition is detected;
   wherein the preset time length is longer than or equal to a processing latency of the PDCCH.

2. The physical downlink control channel detection method according to claim 1, further comprising:
   performing PDCCH detection in the first search space group when any one of the following conditions is satisfied:
   at initial access to a network with a configured search space group obtained;
   at transit from a discontinuous reception DRX off state to a DRX on state;
   after switching to a new bandwidth part BWP; and
   after switching to a new cell.

3. The physical downlink control channel detection method according to claim 1, wherein the preset condition comprises at least one of the following:
   the PDCCH is a PDCCH that is detected in the first search space group;
   the PDCCH is a PDCCH that is scrambled by a specific radio network temporary identity RNTI; and
   content of the PDCCH explicitly indicates switching between search space groups.

4. The physical downlink control channel detection method according to claim 1, wherein the preset time length is obtained in any one of the following manners:
   obtaining a predefined preset time length;
   obtaining a preset time length configured by radio resource control RRC signaling;
   obtaining a correspondence between PDCCH types and preset time lengths that is configured by RRC signaling, and determining the preset time length based on the correspondence and the PDCCH type;
   obtaining a predefined correspondence between PDCCH types and preset time lengths, and determining the preset time length based on the correspondence and the PDCCH type; and
   obtaining a preset time length that is explicitly indicated by downlink control information DCI on the PDCCH.

5. The physical downlink control channel detection method according to claim 1, wherein the switch condition comprises a second switch condition for switching from the second search space group to the first search space group for PDCCH detection, and the second switch condition comprises any one of the following:
   if the terminal has obtained channel occupancy time COT information, switching to the first search space group for PDCCH detection at the end of the COT;
   after an effective time length that is indicated by DCI on the detected PDCCH, switching to the first search space group for PDCCH detection;
   obtaining a predefined first timer, starting the first timer when PDCCH detection is started in the second search space group, and if no PDCCH is detected after the first timer expires, switching to the first search space group for PDCCH detection; and
   obtaining a first timer that is configured by RRC signaling, starting the first timer when PDCCH detection is started in the second search space group, and if no PDCCH is detected after the first timer expires, switching to the first search space group for PDCCH detection.

6. The physical downlink control channel detection method according to claim 5, wherein the first timer is determined based on a channel access type.

7. A physical downlink control channel detection method, applied to a network-side device and comprising:
   configuring at least two search space groups and a switch condition for a terminal, wherein the at least two search space groups comprise a first search space group and a second search space group, and the switch condition is used by the terminal for switching between the first search space group and the second search space group, for physical downlink control channel detection;
   wherein the switch condition comprises a first switch condition for switching from the first search space group to the second search space group for PDCCH detection, and the first switch condition comprises:
   switching to the second search space group for PDCCH detection in a preset time length after a time when a PDCCH that meets a preset condition is detected;
   wherein the preset time length is longer than or equal to a processing latency of the PDCCH.

8. The physical downlink control channel detection method according to claim 7, wherein the preset condition comprises at least one of the following:
   the PDCCH is a PDCCH that is detected in the first search space group;
   the PDCCH is a PDCCH that is scrambled by a specific radio network temporary identity RNTI; and
   content of the PDCCH explicitly indicates switching between search space groups.

9. The physical downlink control channel detection method according to claim 7, further comprising: configuring the preset time length for the terminal, wherein the configuring the preset time length for the terminal comprises any one of the following:

configuring the preset time length by using radio resource control RRC signaling;

configuring a correspondence between PDCCH types and preset time lengths by using RRC signaling; and explicitly indicating a preset time length by using DCI on the PDCCH.

10. The physical downlink control channel detection method according to claim 7, wherein the switch condition comprises a second switch condition for switching from the second search space group to the first search space group for PDCCH detection, and the second switch condition comprises any one of the following:

if the terminal has obtained channel occupancy time COT information, switching to the first search space group for PDCCH detection at the end of the COT;

after an effective time length that is indicated by DCI on the detected PDCCH, switching to the first search space group for PDCCH detection;

obtaining a predefined first timer, starting the first timer when PDCCH detection is started in the second search space group, and if no PDCCH is detected after the first timer expires, switching to the first search space group for PDCCH detection; and obtaining a first timer that is configured by RRC signaling, starting the first timer when PDCCH detection is started in the second search space group, and if no PDCCH is detected after the first timer expires, switching to the first search space group for PDCCH detection.

11. The physical downlink control channel detection method according to claim 10, wherein the first timer is determined based on a channel access type.

12. A communications device, wherein the communications device comprises a processor, a memory, and a computer program stored in the memory and running on the processor, and when the processor executes the computer program, the following steps are implemented:

obtaining at least two search space groups and a switch condition, wherein the at least two search space groups comprise a first search space group and a second search space group; and switching between the first search space group and the second search space group according to the switch condition, for PDCCH detection;

wherein the switch condition comprises a first switch condition for switching from the first search space group to the second search space group for PDCCH detection, and the first switch condition comprises:

switching to the second search space group for PDCCH detection in a preset time length after a time when a PDCCH that meets a preset condition is detected;

wherein the preset time length is longer than or equal to a processing latency of the PDCCH.

13. The communications device according to claim 12, wherein, when the processor executes the computer program, the following steps are further implemented:

performing PDCCH detection in the first search space group when any one of the following conditions is satisfied:

at initial access to a network with a configured search space group obtained;

at transit from a discontinuous reception DRX off state to a DRX on state;

after switching to a new bandwidth part BWP; and after switching to a new cell.

14. The communications device according to claim 12, wherein the preset time length is obtained in any one of the following manners:

obtaining a predefined preset time length;

obtaining a preset time length configured by radio resource control RRC signaling;

obtaining a correspondence between PDCCH types and preset time lengths that is configured by RRC signaling, and determining the preset time length based on the correspondence and the PDCCH type;

obtaining a predefined correspondence between PDCCH types and preset time lengths, and determining the preset time length based on the correspondence and the PDCCH type; and obtaining a preset time length that is explicitly indicated by downlink control information DCI on the PDCCH.

15. A communications device, wherein the communications device comprises a processor, a memory, and a computer program stored in the memory and running on the processor, and when the processor executes the computer program, steps of the physical downlink control channel detection method according to claim 7 are implemented.

* * * * *